(12) United States Patent
Beaucoup

(10) Patent No.: US 8,233,352 B2
(45) Date of Patent: Jul. 31, 2012

(54) AUDIO SOURCE LOCALIZATION SYSTEM AND METHOD

(75) Inventor: Franck Beaucoup, Vancouver (CA)

(73) Assignee: Broadcom Corporation, Irvine, CA (US)

(*) Notice: Subject to any disclaimer, the term of this patent is extended or adjusted under 35 U.S.C. 154(b) by 244 days.

(21) Appl. No.: 12/566,329

(22) Filed: Sep. 24, 2009

(65) Prior Publication Data

US 2011/0038229 A1 Feb. 17, 2011

Related U.S. Application Data

(60) Provisional application No. 61/234,450, filed on Aug. 17, 2009.

(51) Int. Cl.
*G01S 3/80* (2006.01)
*H04R 3/00* (2006.01)

(52) U.S. Cl. .......................... 367/119; 381/92
(58) Field of Classification Search .......... 367/118–119, 367/124, 129
See application file for complete search history.

(56) References Cited

U.S. PATENT DOCUMENTS

| | | | |
|---|---|---|---|
| 5,465,302 A | | 11/1995 | Lazzari et al. |
| 6,914,854 B1* | | 7/2005 | Heberley et al. ............ 367/119 |
| 7,039,199 B2 | | 5/2006 | Rui |
| 7,266,044 B2* | | 9/2007 | Yang .............................. 367/124 |
| 7,701,492 B2 | | 4/2010 | Motomura et al. |
| 7,983,907 B2 | | 7/2011 | Visser et al. |
| 7,991,167 B2 | | 8/2011 | Oxford |
| 2006/0244660 A1 | | 11/2006 | Ann et al. |
| 2006/0280312 A1 | | 12/2006 | Mao |
| 2008/0130914 A1 | | 6/2008 | Cho |
| 2009/0119103 A1 | | 5/2009 | Gerl et al. |
| 2009/0310444 A1 | | 12/2009 | Hiroe |
| 2010/0110232 A1 | | 5/2010 | Zhang et al. |
| 2010/0217590 A1 | | 8/2010 | Nemer et al. |
| 2010/0245624 A1 | | 9/2010 | Beaucoup |
| 2011/0129095 A1 | | 6/2011 | Avendano et al. |

OTHER PUBLICATIONS

Schlesinger et al., "Application of MVDR Beamforming to Spherical Arrays", Ambiosonics Symposium, Jun. 2009, p. 1-5.*
Kim et al., "High Resolution Broadband Beamforming based on the MVDR Method", 2000 IEEE, pp. 1673-1676.*
Van Veen, et al., "Beamforming: A Versatile Approach to Spatial Filtering", IEEE ASSP Magazine, Apr. 1988, pp. 4-24.
McCowan, "Microphone Arrays: A Tutorial", PhD Thesis, Robust Speech Recognition using Microphone Arrays, Queensland University of Technology, Australia, Apr. 2001, pp. 1-36.
Badidi et al., "A neural network approach for DOA estimation and tracking", IEEE, 2000, pp. 434-438.
Campbell Jr., "Speaker Recognition: A Tutorial", Proceedings of the IEEE, vol. 85, No. 9, Sep. 1997, pp. 1437-1462.

(Continued)

*Primary Examiner* — Ian Lobo
(74) *Attorney, Agent, or Firm* — Fiala & Weaver P.L.L.C.

(57) ABSTRACT

A system and method for performing audio source localization that uses minimum variance distortionless response (MVDR) beams or other super-directive beams that are more suitable for reducing noise, interference and/or acoustic coupling than the delay-and-sum beams conventionally used in performing audio source localization based on a Steered Response Power (SRP) approach. Since super-directive beams such as MVDR beams do not provide good properties for performing conventional SRP-based audio source localization, an embodiment of the present invention utilizes a different metric than maximum response power in order to determine which of a plurality of beams provides the best response for audio source localization. This metric involves identifying which beam provides the smallest measure of distortion with respect to a reference power or reference response.

27 Claims, 8 Drawing Sheets

OTHER PUBLICATIONS

Carter, "Coherence and Time Delay Estimation", Proceedings of the IEEE, vol. 75, No. 2, Feb. 1987, pp. 236-255.

Chen et al., "Time Delay Estimation in Room Acoustic Environments: An Overview", EURASIP Journal on Applied Signal Processing, vol. 2006, Article ID 26503, 2006, pp. 1-19.

Knapp et al., "The Generalized Correlation Method for Estimation of Time Delay", IEEE Transactions on Acoustics, Speech, and Signal Processing, vol. 24, No. 4, Aug. 1976, pp. 320-327.

Lleida et al., "Robust continuous speech recognition system based on microphone array", Acoustics, Speech, and Signal processing, Proceedings of the 1998 IEEE International Conference on vol. 1, 1998, pp. 241-244.

Stokes et al., "Speaker identification using a microphone array and a joint-HMM with speech spectrum and angle of arrival", Multimedia and Expo, ICME, 2006, pp. 1381-1384.

* cited by examiner

AUDIO SOURCE LOCALIZATION SYSTEM AND METHOD

CROSS-REFERENCE TO RELATED APPLICATIONS

This application claims priority to U.S. Provisional Patent Application No. 61/234,450 filed Aug. 17, 2009, the entirety of which is incorporated by reference herein.

BACKGROUND OF THE INVENTION

1. Field of the Invention

The present invention generally relates to systems that automatically determine the position of a desired audio source, such as a talker, based on audio input received via an array of microphones.

2. Background

As used herein, the term audio source localization refers to a technique for automatically determining the position of a desired audio source, such as a talker, in a room or other area. FIG. 1 is a block diagram of an example system 100 that performs audio source localization. System 100 may represent, for example and without limitation, a speakerphone, an audio teleconferencing system, a video game system, or other system capable of both capturing and playing back audio signals.

As shown in FIG. 1, system 100 includes receive processing logic 102 that processes an audio signal for playback via speakers 104. The audio signal processed by receive processing logic 102 may be received from a remote audio source such as a far-end speaker in a speakerphone or audio teleconferencing scenario. Additionally or alternatively, the audio signal processed by receive processing logic 102 may be generated by system 100 itself or some other source connected locally thereto.

As further shown in FIG. 1, system 100 further includes an array of microphones 106 that converts sound waves produced by local audio sources into audio signals. These audio signals are then processed by audio source localization logic 108. In particular, audio source localization logic 108 periodically processes the audio signals generated by microphone array 106 to estimate a current position of a desired audio source 114. Desired audio source 114 may represent, for example, a near-end talker in a speakerphone or audio teleconferencing scenario. The estimated current position of desired audio source 114 as determined by audio source localization logic 108 may be defined, for example, in terms of an estimated current direction of arrival of sound waves emanating from desired audio source 114.

System 100 also includes a steerable beamformer 110 that is configured to process the audio signals generated by microphone array 106 to produce a single output audio signal. In producing the output audio signal, steerable beamformer 110 performs spatial filtering based on the estimated current position of desired audio source 114 such that signal components attributable to sound waves emanating from positions other than the estimated current position of desired audio source 114 are attenuated relative to signal components attributable to sound waves emanating from the estimated current position of desired audio source 114. This tends to have the beneficial effect of attenuating undesired audio sources relative to desired audio source 114, thereby improving the overall quality and intelligibility of the output audio signal. In a speakerphone or audio teleconferencing scenario, the output audio signal produced by steerable beamformer 110 is transmitted to a far-end listener.

The information produced by audio source localization logic 108 may also be useful for applications other than steering a beamformer used for acoustic transmission. For example, the information produced by audio source localization logic 108 may be used in a video game system to integrate the estimated current position of a player within a room into the context of a game. Various other beneficial applications of audio source localization also exist. These applications are generally represented in system 100 by the element labeled "other applications" and marked with reference numeral 112.

One problem for system 100 and other systems that perform audio source localization is the presence of acoustic echo 116. Acoustic echo 116 is generated when system 100 plays back audio signals, an echo of which is picked up by microphone array 106. In a speakerphone or audio teleconferencing system, such echo may be attributable to speech signals representing the voices of one or more far end speakers that are played back by the system. In a video game system, acoustic echo may also be attributable to music, sound effects, and/or other audio content produced by a game as well as the voices of other players when online interaction with remote players is supported. It is noted, however, that many systems exist that implement audio source localization but do not play back audio signals. For these systems, the presence of acoustic echo is not an issue.

Another problem for system 100 and other systems that perform audio source localization is the presence of noise and/or interference 118 in the environment of desired audio source 114. As used herein, the term noise generally refers to undesired audio that tends to be stationary in nature while the term interference generally refers to undesired audio that tends to be non-stationary in nature.

The presence of echo, noise and/or interference can cause audio source localization logic 108 to perform poorly, since the logic may not be able to adequately distinguish between desired audio source 114 whose position is to be determined and the echo, noise and/or interference. This may cause audio source localization logic 108 to incorrectly estimate the current position of desired audio source 114.

One known technique for performing audio source localization is termed the Steered Response Power (SRP) technique. SRP is widely considered to be the most robust approach for performing audio source localization in the presence of noise. SRP typically involves using a microphone array to steer beams generated using the well-known delay-and-sum beamforming technique so that the beams are pointed in different directions in space (referred to herein as the "look" directions of the beams). The delay-and-sum beams may be spectrally weighted. The look direction associated with the delay-and-sum beam that provides the maximum response power is then chosen as the direction of arrival of sound waves emanating from the desired audio source. The delay-and-sum beam that provides the maximum response power may be determined, for example, by finding the index i that satisfies:

$$\operatorname*{argmax}_{i} \sum_{f} |B_i(f, t)|^2 \cdot W(f), \text{ for } i = 1 \ldots n,$$

wherein n is the total number of delay-and-sum beams, $B_i(f,t)$ is the response of delay-and-sum beam i at frequency f and time t, $|B_i(f,t)|^2$ is the power of the response of delay-and-sum beam i at frequency f and time t, and $W(f)$ is a spectral weight associated with frequency f. Note that in this particular approach the response power constitutes the sum of a plurality of spectrally-weighted response powers determined at a plurality of different frequencies.

There are certain problems associated with using SRP, as that technique is conventionally implemented, for performing audio source localization. For example, delay-and-sum beams are often not directive enough to provide good spatial resolution. To help illustrate this, FIG. 2 shows the level of response of five delay-and-sum beams having different look directions as a function of sound wave direction of arrival. The beams were generated using a linear array of five microphones spaced 2 cm apart and the response was measured at 1000 Hertz (Hz). The look direction of each beam and the directions of arrival are expressed in terms of angular difference from a reference direction, which in this case is the broadside direction of the microphone array. As shown in FIG. 2, the relevant delay-and-sum beams have look directions corresponding to −90°, −45°, 0°, 45° and 90°. The curves show that the delay-and-sum beams lead to correct SRP properties in that the maximum response power for each beam is obtained at or around the look direction of the beam.

However, the curves also show that the delay-and-sum beams provide poor directivity. For example, three out of the five delay-and-sum beams provide levels of response that are within about 0.3 dB for directions of arrival near+/−30°. Such a small separation between response levels can lead to problems identifying the best beam if the resolution used to represent response levels and/or the difference between response levels is too coarse. Furthermore, to accommodate such small separation in response levels, systems may be implemented that use very small thresholds to determine when to switch between beams. In such systems, minor variability in response levels can lead to frequent and undesired switching between beams.

In addition to failing to provide good spatial resolution, delay-and-sum beams are generally not the type of beams used for performing acoustic transmission as performed by, for example, many speakerphones and audio teleconferencing systems. Rather, minimum variance distortionless response (MVDR) beams or other super-directive beams that are more suitable for reducing noise, interference and/or acoustic coupling with a loudspeaker are often used. Thus, if SRP is performed to determine the direction of arrival of sound waves emanating from a desired audio source and that direction of arrival is then used to steer an MVDR beamformer or other super-directive beamformer for the purposes of acoustic transmission, then it will be impossible to know in advance what consequence an audio source localization error will have on the quality of the audio signal obtained for acoustic transmission.

What is needed, then, is a system for performing audio source localization that addresses one or more of the aforementioned shortcomings associated with conventional approaches.

BRIEF SUMMARY OF THE INVENTION

A system and method for performing audio source localization is described herein. In one embodiment, the system and method performs audio source localization using minimum variance distortionless response (MVDR) beams or other super-directive beams that are more suitable for reducing noise, interference and/or acoustic coupling with a loudspeaker than the delay-and-sum beams conventionally used in performing audio source localization based on the Steered Response Power (SRP) approach. Such beams are more directive than delay-and-sum beams and thus provide better spatial resolution for performing audio source localization. Furthermore, such beams are also well suited for performing acoustic transmission. Thus, an embodiment of the invention may use an MVDR beamformer or other super-directive beamformer for performing both audio source localization and acoustic transmission. The use of the same beamforming technique for both audio source localization and acoustic transmission facilitates more predictable system performance and may also allow for certain efficiencies in system implementation.

However, since super-directive beams such as MVDR beams do not provide good properties for performing conventional SRP-based audio source localization, an embodiment of the present invention utilizes a different metric than maximum response power in order to determine which of a plurality of beams provides the best response for audio source localization. As will be described herein, this metric involves identifying which beam provides the smallest measure of distortion with respect to a reference power or reference response.

In particular, a method for estimating a direction of arrival of sound waves emanating from an audio source is described herein. In accordance with the method, a plurality of audio signals produced by an array of microphones is received. The plurality of audio signals is processed in a beamformer to produce a plurality of responses corresponding respectively to a plurality of beams having different look directions. A measure of distortion is calculated for each response in the plurality of responses. A determination is made as to which response in the plurality of responses provides a smallest measure of distortion. The look direction of the beam corresponding to the response that provides the smallest measure of distortion is then identified as the estimated direction of arrival.

In one embodiment, the plurality of responses corresponds respectively to a plurality of superdirective beams having different look directions. For example, the plurality of responses may correspond respectively to a plurality of MVDR beams having different look directions. Furthermore, the plurality of MVDR beams may comprise a plurality of fixed MVDR beams or a plurality of adaptive MVDR beams.

In accordance with one implementation of the foregoing method, calculating the measure of distortion for each response in the plurality of responses includes calculating an absolute difference between a power of each response in the plurality of responses and a reference power. The reference power may comprise, for example, a power of a response of a designated microphone in the array of microphones or an average response power of two or more designated microphones in the array of microphones. In accordance with an alternate implementation, calculating the measure of distortion for each response in the plurality of responses includes calculating a power of a difference between each response in the plurality of responses and a reference response. The reference response may comprise, for example, a response of a designated microphone in the array of microphones.

In accordance with a further implementation of the foregoing method, calculating the measure of distortion for a response in the plurality of responses includes (a) calculating a measure of distortion for the response at each of a plurality of frequencies and (b) summing the measures of distortion calculated in step (a). In accordance with a further alternate implementation, calculating the measure of distortion for a response in the plurality of responses includes (a) calculating a measure of distortion for the response at each of a plurality of frequencies, (b) multiplying each measure of distortion calculated in step (a) by a frequency-dependent weight to produce a plurality of frequency-weighted measures of distortion, and (c) summing the frequency-weighted measures of distortion calculated in step (b).

The foregoing method may further include steering a beam produced by a steerable beamformer toward the estimated direction of arrival and processing the plurality of audio signals in the steerable beamformer to produce an output audio signal for acoustic transmission. The foregoing method may also include using the response that provides the smallest measure of distortion to produce an output audio signal for acoustic transmission.

A system for estimating a direction of arrival of sound waves emanating from an audio source is also described herein. The system includes an array of microphones, a beamformer, a distortion calculator and a direction of arrival selector. The beamformer processes a plurality of audio signals produced by the array of microphones to produce a plurality of responses corresponding respectively to a plurality of beams having different look directions. The distortion calculator calculates a measure of distortion for each response in the plurality of responses. The direction of arrival selector determines which response in the plurality of responses provides a smallest measure of distortion and identifies the look direction of the beam corresponding to the response that provides the smallest measure of distortion as the estimated direction of arrival.

A computer program product is also described herein. The computer program product includes a computer-readable medium having computer program logic recorded thereon for enabling a processor to estimate a direction of arrival of sound waves emanating from an audio source. The computer program logic includes first means, second means, third means, fourth means and fifth means. The first means are for enabling the processor to receive a plurality of audio signals produced by an array of microphones. The second means are for enabling the processor to process the plurality of audio signals to produce a plurality of responses corresponding respectively to a plurality of beams having different look directions. The third means are for enabling the processor to calculate a measure of distortion for each response in the plurality of responses. The fourth means are for enabling the processor to determine which response in the plurality of responses provides a smallest measure of distortion. The fifth means are for enabling the processor to identify the look direction of the beam corresponding to the response that provides the smallest measure of distortion as the estimated direction of arrival.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
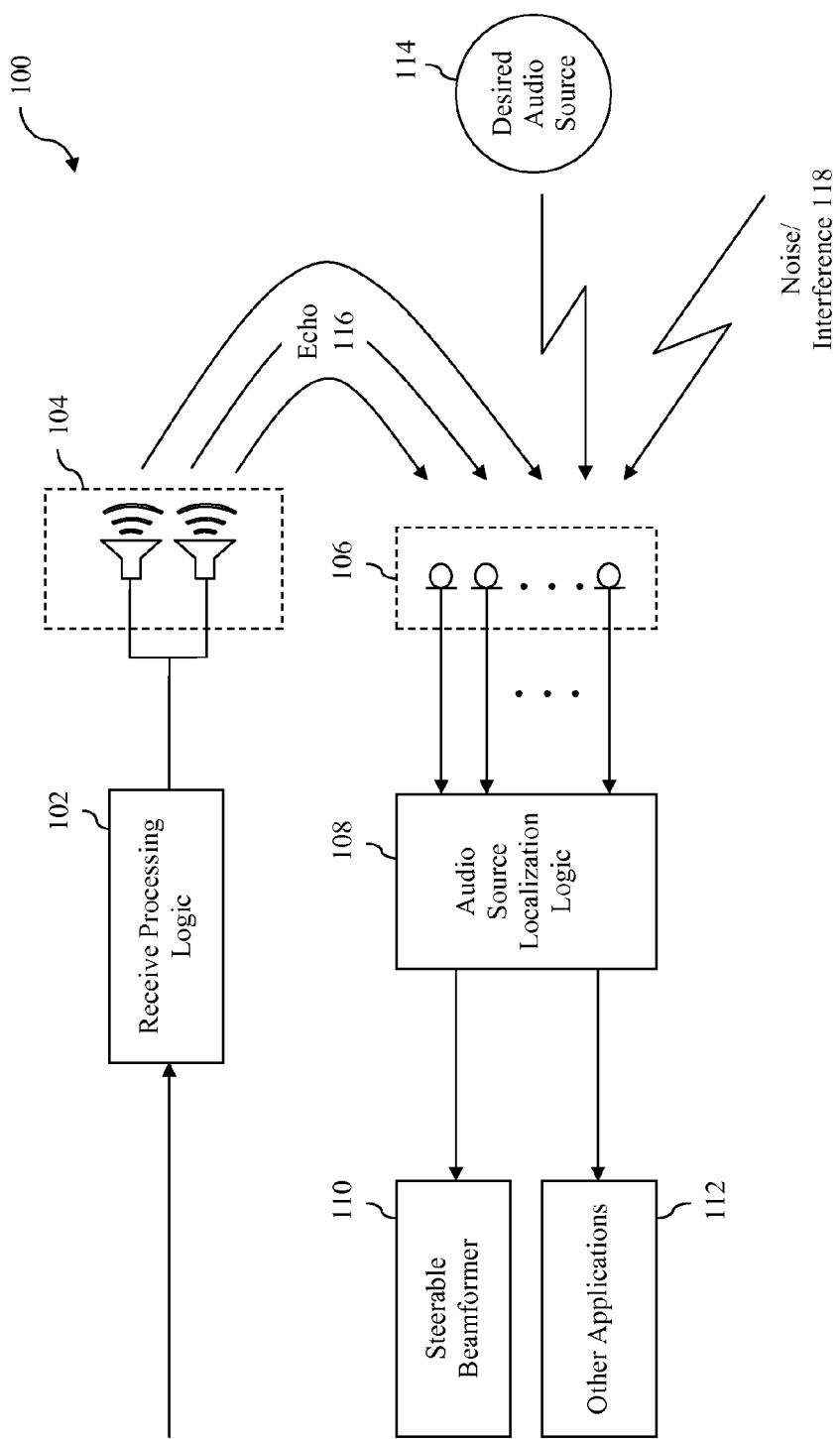
FIG. 1 is a block diagram of an example system that performs audio source localization.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description of the present invention refers to the accompanying drawings that illustrate exemplary embodiments consistent with this invention. Other embodiments are possible, and modifications may be made to the embodiments within the spirit and scope of the present invention. Therefore, the following detailed description is not meant to limit the invention. Rather, the scope of the invention is defined by the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

B. Example System for Performing Audio Source Localization

Figure 3:
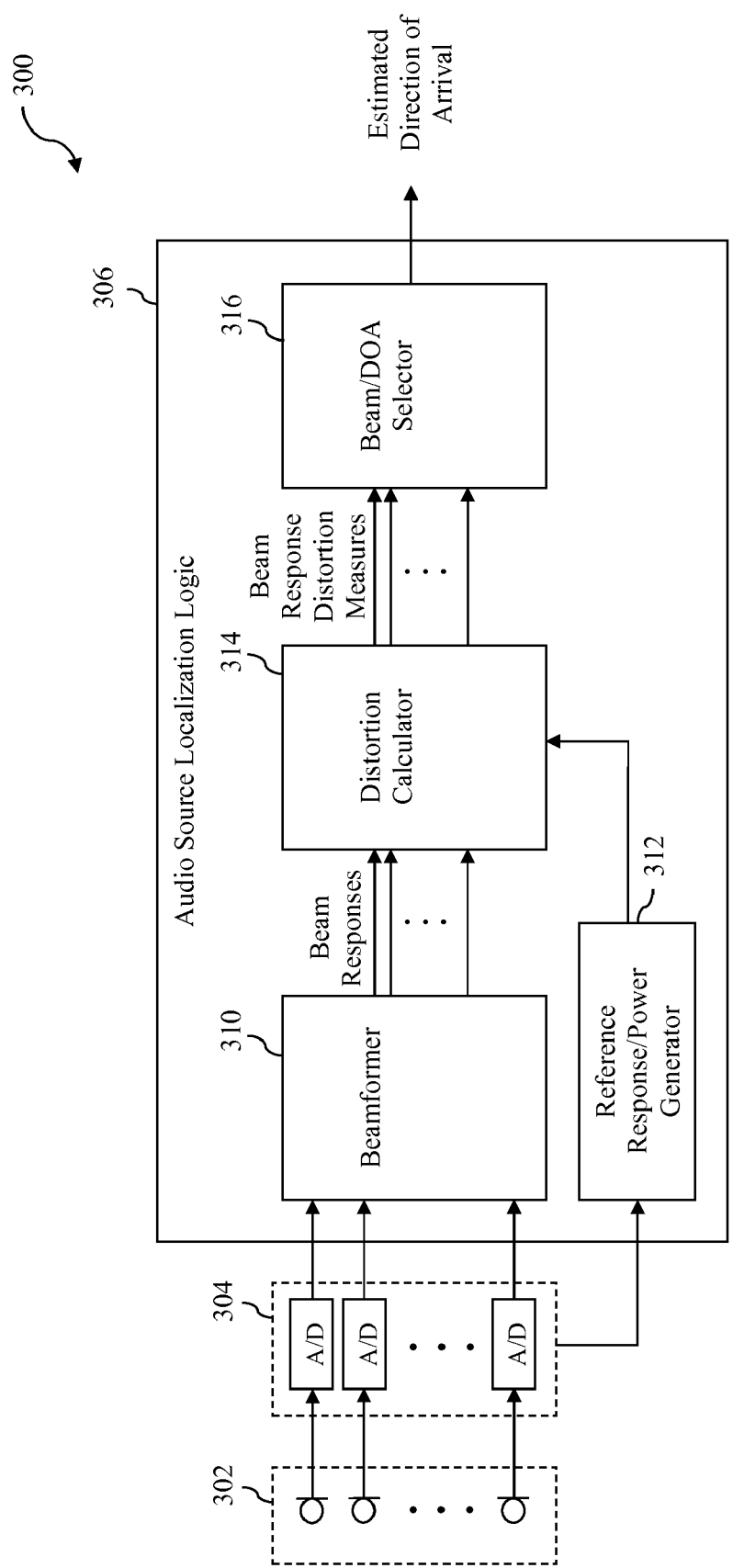
FIG. 3 is a block diagram of an example system for performing audio source localization in accordance with an embodiment of the present invention.

FIG. 3 is a block diagram of an example system 300 for performing audio source localization in accordance with an embodiment of the present invention. System 300 may be used to estimate a direction of arrival of sound waves emanating from a desired audio source. System 300 may be implemented in any of a wide variety of devices or systems and may be used to support any of a wide variety of applications. For example, system 300 may be implemented in a speakerphone, audio teleconferencing system, or audio/video teleconferencing system to facilitate steering of a beamformer used for performing acoustic transmission towards a desired talker. As a further example, system 300 may be implemented as part of a video game system that integrates the current position of a player within a room or other area into the context of a game. For example, a video game system may control the placement of an avatar that represents a player within a virtual environment based on the current position of the player as determined by system 300. As a still further example, system 300 may be implemented as part of surround sound gaming system or application to perform proper sound localization. These examples are provided by way of illustration only and are not intended to be limiting. Persons skilled in the relevant art(s) will readily appreciate that system 300 may be implemented in devices/systems other than those specifically described herein and may be used to support applications other than those specifically described herein.

As shown in FIG. 3, system 300 includes a number of interconnected components including a microphone array 302, an array of analog-to-digital (A/D) converters 304 and audio source localization logic 306. Each of these components will now be described.

Microphone array 302 comprises two or more microphones that are mounted or otherwise arranged in a manner such that at least a portion of each microphone is exposed to sound waves emanating from audio sources proximally located to system 300. Each microphone in array 302 comprises an acoustic-to-electric transducer that operates in a well-known manner to convert such sound waves into an analog audio signal. The analog audio signal produced by each microphone in microphone array 302 is provided to a corresponding A/D converter in array 304. Each A/D converter in array 304 operates to convert an analog audio signal produced by a corresponding microphone in microphone array 302 into a digital audio signal comprising a series of digital audio samples prior to delivery to audio source localization logic 306.

Audio source localization logic 306 is connected to array of A/D converters 304 and receives digital audio signals therefrom. As shown in FIG. 3, audio source localization logic 306 includes a number of sub-components including a beamformer 310, a reference response/power generator 312, a distortion calculator 314, and a direction of arrival selector 316.

Beamformer 310 is configured to receive the digital audio signals generated by array of A/D converters 304 and to process the signals to produce a plurality of responses that correspond respectively to a plurality of beams having different look directions. As used herein, the term "beam" refers to the main lobe of a spatial sensitivity pattern (or "beam pattern") implemented by a beamformer through selective weighting of the audio signals produced by a microphone array. By modifying the weights applied to the signals produced by the microphone array, a beamformer may point or steer the beam in a particular direction, which is sometimes referred to as the "look direction" of the beam. The response associated with each beam is then provided to distortion calculator 314.

In one embodiment, beamformer 310 determines a response corresponding to each beam by determining a response at each of a plurality of frequencies at a particular time for each beam. For example, if there are n beams, beamformer 310 may determine for each of a plurality of frequencies:

$$B_i(f,t), \text{ for } i=1 \ldots n,$$

wherein $B_i(f,t)$ is the response of beam i at frequency f and time t.

As noted in the background section above, the delay-and-sum beams conventionally used to perform audio source localization in accordance with the Steered Response Power (SRP) approach are often not directive enough to provide good spatial resolution. Furthermore, delay-and-sum beams are generally not the type of beams used for performing acoustic transmission and thus provide poor system-level performance control when used to support this function. To address these issues, in one embodiment of the present invention, beamformer 310 generates beams using a superdirective beamforming algorithm to acquire beam response information. For example, beamformer 310 may generate beams using a Minimum Variance Distortionless Response (MVDR) beamforming algorithm. As will be appreciated by persons skilled in the relevant art(s), in MVDR beamforming, the beamformer response is constrained so that signals from the direction of interest are passed with no distortion relative to a reference response. The response power in certain directions outside of the direction of interest is minimized.

Figure 2:
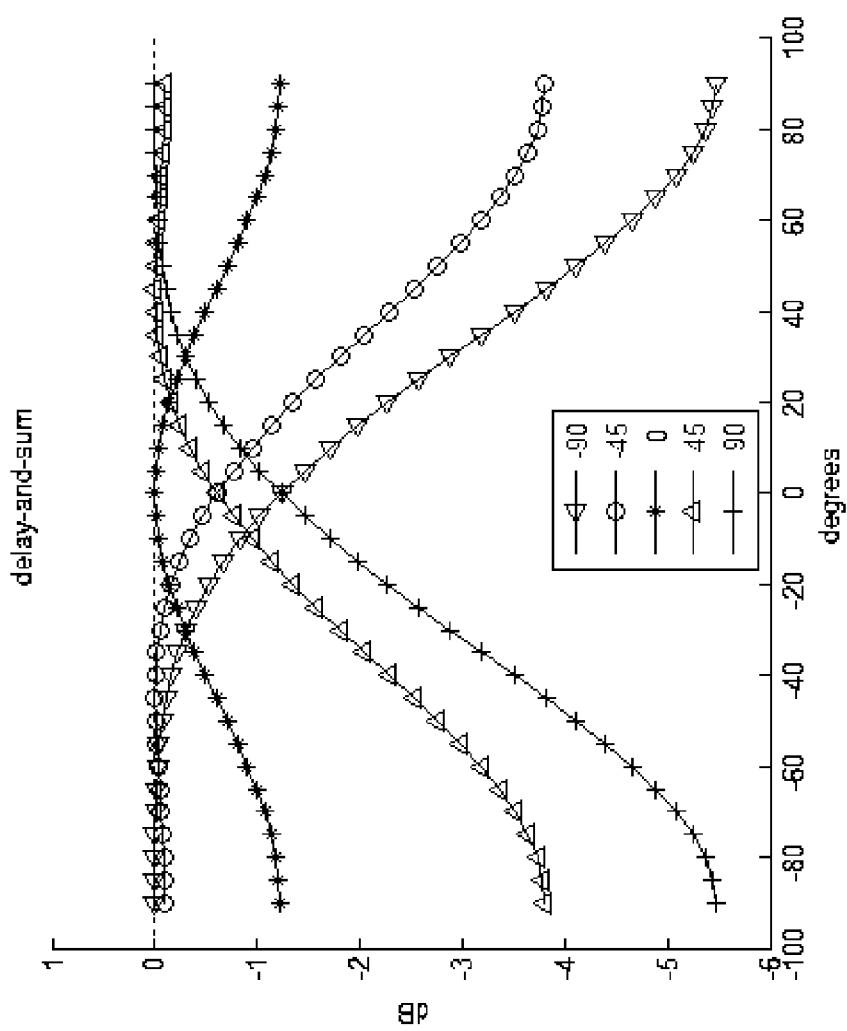
FIG. 2 is a graphical illustration of the level of response of five delay-and-sum beams having different look directions as a function of sound wave direction of arrival.
Figure 4:
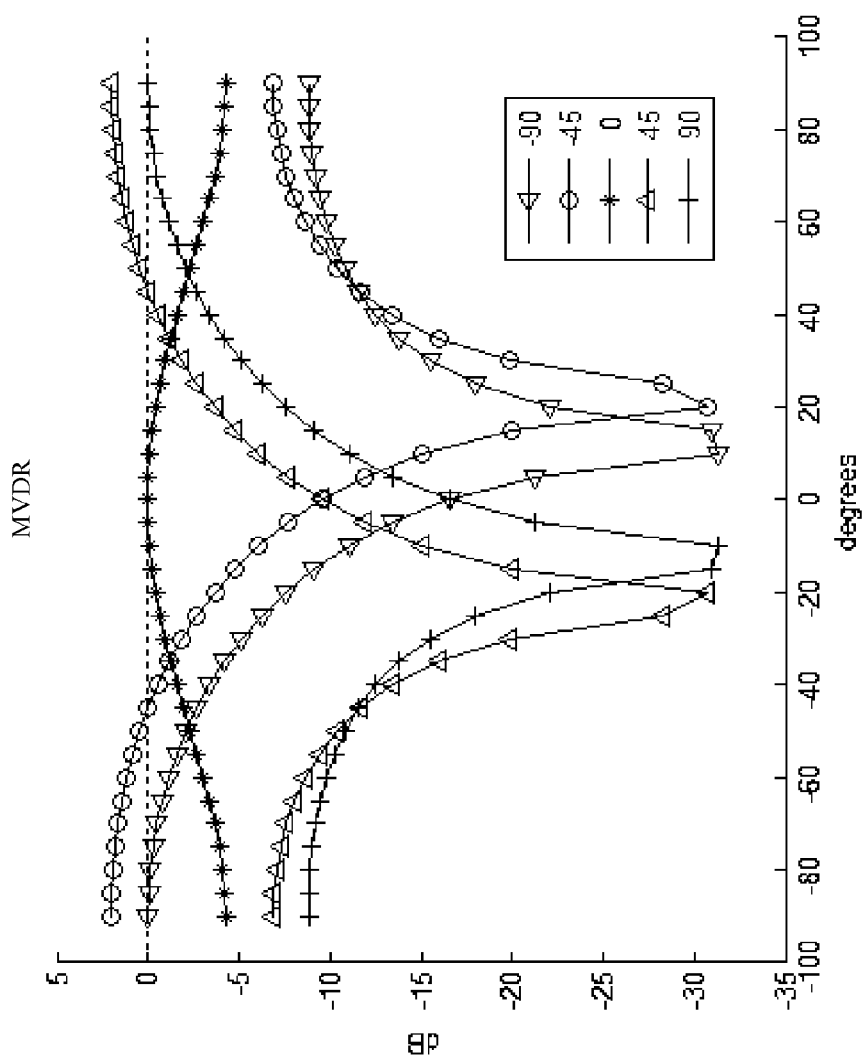
FIG. 4 is a graphical illustration of the level of response of five Minimum Variance Distortionless Response (MVDR) beams having different look directions as a function of sound wave direction of arrival.

To help illustrate the spatial resolution of MVDR beamforming, FIG. 4 shows the level of response of five MVDR beams having different look directions as a function of sound wave direction of arrival. Like the delay-and-sum beams shown in FIG. 2, the MVDR beams were generated using a linear array of five microphones spaced 2 cm apart and the response was measured at 1000 Hertz (Hz). The look direction of each beam and the directions of arrival are expressed in terms of angular difference from a reference direction, which in this case is the broadside direction of the microphone array. As shown in FIG. 4, the relevant MVDR beams have look directions corresponding to −90°, −45°, 0°, 45° and 90°. The curves show that the MVDR beams provide better directivity than the delay-and-sum beams having the same look directions shown in FIG. 2. This is because there is better overall separation between the response levels of the MVDR beams at the various directions of arrival as compared to the response levels of the delay-and-sum beams.

However, the curves also show that the MVDR beams exhibit poor properties for performing SRP-based audio source localization in that the MVDR beams do not always provide maximum response power in the look direction. For example, the 90° MVDR beam is dominated in power by the 45° MVDR beam even near a direction of arrival of 90°. As a result, the 90° MVDR beam would never be chosen by a conventional SRP algorithm. As will be described herein, an embodiment of the present invention addresses this issue by utilizing a different metric than maximum response power in order to determine which of a plurality of beams provides the best response for audio source localization. This metric involves identifying which beam provides the smallest measure of distortion with respect to a reference power or a reference response.

Beamformer 310 may utilize a fixed or adaptive beamforming algorithm, such as a fixed or adaptive MVDR beamforming algorithm, in order to produce the beams and corresponding beam responses. As will be appreciated by persons skilled in the relevant art(s), in fixed beamforming, the weights applied to the audio signals generated by the microphone array are pre-computed and held fixed during deployment. The weights are independent of observed target and/or interference signals and depend only on the assumed source and/or interference location. In contrast, in adaptive beamforming, the weights applied to the audio signals generated by the microphone array may be modified during deployment based on observed signals to take into account a changing source and/or interference location. Adaptive beamforming may be used, for example, to steer spatial nulls in the direction of discrete interference sources.

Reference power/response generator 312 is configured to receive one or more of the digital audio signals generated by array of A/D converters 304 and to process the signal(s) to produce a reference power or a reference response, depending upon the implementation. Distortion calculator 314 is configured to receive a set of beam responses from beamformer 310 and a reference power or reference response from reference response generator 312. Responsive to receiving such information, distortion calculator 314 calculates a measure of distortion for each response in the set of beam responses received from beamformer 310 with respect to the reference power or the reference response received from reference power/response generator 312. Distortion calculator 314 is further configured to provide the measure of distortion for each beam response to direction of arrival selector 316.

In one embodiment, distortion calculator 314 is configured to calculate the measure of distortion for each beam response received from beamformer 310 by calculating an absolute difference between a power of each beam response and a reference power received from reference response generator 312. The measure of distortion in such an embodiment may be termed the response power distortion. For example, in an embodiment in which n beam responses are received from beamformer 310, distortion calculator 314 may calculate the measure of distortion for each beam response by calculating:

$$||B_i(t)|^2 - |mic(t)|^2|, \text{ for } i=1 \ldots n,$$

wherein $B_i(t)$ is the response of beam i at time t, $|B_i(t)|^2$ is the power of the response of beam i at time t, $|mic(t)|^2$ is the reference power at time t, and $||B_i(t)|^2 - |ref(t)|^2|$ is the response power distortion for beam i at time t.

In the foregoing embodiment, the reference power comprises the power of a response of a designated microphone in the array of microphones, wherein the response of the designated microphone at time t is denoted mic(t). In an alternate embodiment, the reference power may comprise an average response power of two or more designated microphones in the array of microphones. However, these examples are not intended to be limiting and persons skilled in the relevant art(s) will readily appreciate that other methods may be used to calculate the reference power.

In one implementation of the foregoing embodiment, distortion calculator 314 is configured to calculate a measure of distortion for a beam response by calculating a measure of distortion for the beam response at each of a plurality of frequencies and then summing the measure of distortions so calculated across the plurality of frequencies. In accordance with such an implementation, distortion calculator 314 may calculate the measure of distortion for each beam response by calculating:

$$\sum_f ||B_i(f, t)|^2 - |mic(f, t)|^2|, \text{ for } i = 1 \ldots n$$

wherein $B_i(f,t)$ is the response of beam i at frequency f and time t, $|B_i(f,t)|^2$ is the power of the response of beam i at frequency f and time t, $|mic(f,t)|^2$ is the reference power at frequency f and time t, and $||B_i(f,t)|^2 - |mic(f,t)|^2|$ is the response power distortion for beam i at frequency f and time t.

In a further implementation of the foregoing embodiment, distortion calculator 314 is configured to calculate a measure of distortion for a beam response by calculating a measure of distortion for the beam response at each of a plurality of frequencies, multiplying each measure of distortion so calculated by a frequency-dependent weight to produce a plurality of frequency-weighted measures of distortion, and then summing the frequency-weighted measures of distortion. In accordance with such an implementation, distortion calculator 314 may calculate the measure of distortion for each beam response by calculating:

$$\sum_f ||B_i(f, t)|^2 - |mic(f, t)|^2| \cdot W(f), \text{ for } i = 1 \ldots n,$$

wherein W(f) is a spectral weight associated with frequency f and wherein the remaining variables are defined as set forth in the preceding paragraph.

In an alternate embodiment, distortion calculator 314 is configured to calculate the measure of distortion for each beam response received from beamformer 310 by calculating a power of a difference between each beam response and a reference response received from reference power/response generator 312. The measure of distortion in such an embodiment may be termed the response distortion power. For example, in an embodiment in which n beam responses are received from beamformer 310, distortion calculator 314 may calculate the measure of distortion for each beam response by calculating:

$$|B_i(t) - mic(t)|^2, \text{ for } i=1 \ldots n,$$

wherein $B_i(t)$ is the response of beam i at time t, mic(t) is the reference response at time t, and $|B_i(t) - mic(t)|^2$ is the response distortion power for beam i at time t.

In the foregoing embodiment, the reference response mic(t) comprises the response of a designated microphone in the array of microphones. However, this example is not intended to be limiting and persons skilled in the art will readily appreciate that other methods may be used to determine the reference response.

In one implementation of the foregoing embodiment, distortion calculator 314 is configured to calculate a measure of distortion for a beam response by calculating a measure of distortion for the beam response at each of a plurality of frequencies and then summing the measure of distortions so calculated across the plurality of frequencies. In accordance with such an implementation, distortion calculator 314 may calculate the measure of distortion for each beam response by calculating:

$$\sum_f |B_i(f, t) - mic(f, t)|^2, \text{ for } i = 1 \ldots n$$

wherein $B_i$ (f,t) is the response of beam i at frequency f and time t, mic(f,t) is the reference response at frequency f and time t, and $|B_i(f,t) - mic(f,t)|^2$ is the response distortion power for beam i at frequency f and time t.

In a further implementation of the foregoing embodiment, distortion calculator 314 is configured to calculate a measure of distortion for a beam response by calculating a measure of distortion for the beam response at each of a plurality of frequencies, multiplying each measure of distortion so calculated by a frequency-dependent weight to produce a plurality of frequency-weighted measures of distortion, and then summing the frequency-weighted measures of distortion. In accordance with such an implementation, distortion calculator 314 may calculate the measure of distortion for each beam response by calculating:

$$\sum_f |B_i(f, t) - mic(f, t)|^2 \cdot W(f), \text{ for } i = 1 \ldots n,$$

wherein W(f) is a spectral weight associated with frequency f and wherein the remaining variables are defined as set forth in the preceding paragraph.

The foregoing approaches for determining a measure of distortion for each beam response received from beamformer 310 with respect to a reference power or reference response received from reference power/response generator 312 have been provided herein by way of example only and are not intended to limit the present invention. Persons skilled in the relevant art(s) will readily appreciate that other approaches may be used to determine the measures of distortion. For example, rather than measuring the distortion of the response power for each beam response, distortion calculator 314 may measure the distortion of the response magnitude for each beam response. As another example, rather than measuring the power of the response distortion for each beam response, distortion calculator 314 may measure the magnitude of the response distortion for each beam response. Still other approaches may be used.

Direction of arrival selector 316 is configured to receive the measure of distortion for each beam response produced by distortion calculator 314 and, based on such information, to determine which beam response provides the smallest measure of distortion. The search for the beam response that provides the smallest measure of distortion is premised on the observation that a beam pointing in the correct look direction should be distortionless. In other words, the power or response provided by a beam pointing in the correct look direction should be the same as that provided by the reference power or reference response (e.g, the power or response of a designated microphone in the microphone array).

Direction of arrival selector 316 is further configured to identify the look direction of the beam corresponding to the beam response that provides the smallest measure of distortion as the estimated direction of arrival of sound waves emanating from a desired audio source. Direction of arrival selector 316 then outputs the estimated direction of arrival, which may be subsequently used for performing other functions as will be described in more detail herein.

The foregoing operations of beamformer 310, reference power/response generator 312, distortion calculator 314 and direction of arrival selector 316 may be performed on a periodic basis in order to provide an updated current estimated direction of arrival of sound waves emanating from a desired audio source.

In one embodiment, at least a portion of the operations performed by each of the sub-components of audio source localization logic 306 is implemented in software. In accordance with such an implementation, the software operations are carried out via the execution of instructions by one or more general purpose or special-purpose processors. In further accordance with such an implementation, digital audio samples, control parameters, and variables used during software execution may be read from and/or written to one or more data storage components, devices, or media that are directly or indirectly accessible to the processor(s).

Figure 5:
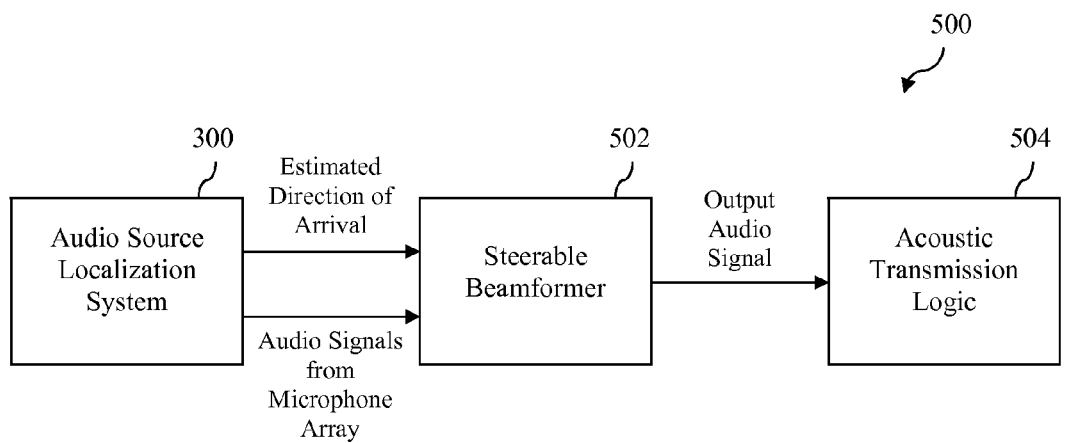
FIG. 5 is a block diagram of a first system that implements audio source localization to support acoustic transmission in accordance with an embodiment of the present invention.

As noted above, system 300 may be implemented in a speakerphone, audio teleconferencing system, or audio/video teleconferencing system to facilitate steering of a beamformer used for performing acoustic transmission towards a desired talker. FIG. 5 is a block diagram of a system 500 in accordance with such an implementation. As shown in FIG. 5, system 500 includes audio source localization system 300 as described above in reference to FIG. 3, a steerable beamformer 502 and acoustic transmission logic 504. Audio source localization system 300 operates in a manner previously described to produce an estimated direction of arrival of sound waves emanating from a desired audio source, such as a near-end talker. The estimated direction of arrival is then provided to steerable beamformer 502. Steerable beamformer 502 steers a beam toward the estimated direction of arrival and then processes the audio signals generated by microphone array 304 in accordance with the steered beam to produce an output audio signal. The output audio signal is then provided to acoustic transmission logic 504. Acoustic transmission logic 504 operates to transmit the output audio signal over a wired and/or wireless communication medium to a remote system or device where it may be played back, for example, to one or more far end listeners.

In one embodiment of system 500, beamformer 310 used by audio source localization logic 306 and steerable beamformer 502 implement the same beamforming algorithm. For example, both beamformers may comprise identically-configured fixed or adaptive MVDR beamformers. By using the same beamforming algorithm for audio source localization as is used for acoustic transmission, more predictable system performance may be achieved.

Figure 6:
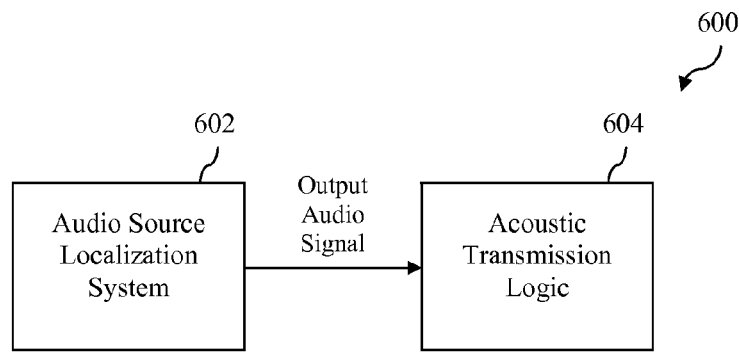
FIG. 6 is a block diagram of a second system that implements audio source localization to support acoustic transmission in accordance with an embodiment of the present invention.

In a further implementation, audio source localization system 300 may be modified to include logic that generates an output audio signal directly from the beam response that provides the smallest measure of distortion as determined by direction of arrival selector 316. Since the look direction of the beam associated with the selected response is considered to be the estimated direction of arrival of sound waves emanating from the desired audio source, then the response obtained using this beam will presumably attenuate undesired audio sources that are not similarly positioned. The modified audio source localization system is represented by audio source localization system 602 of system 600 in FIG. 6. As shown in FIG. 6, audio source localization system 602 is capable of producing an output audio signal which may be fed directly to acoustic transmission logic 604. Acoustic transmission logic 604 operates to transmit the output audio signal over a wired and/or wireless communication medium to a remote system or device where it may be played back, for example, to one or more far end listeners.

Figure 7:
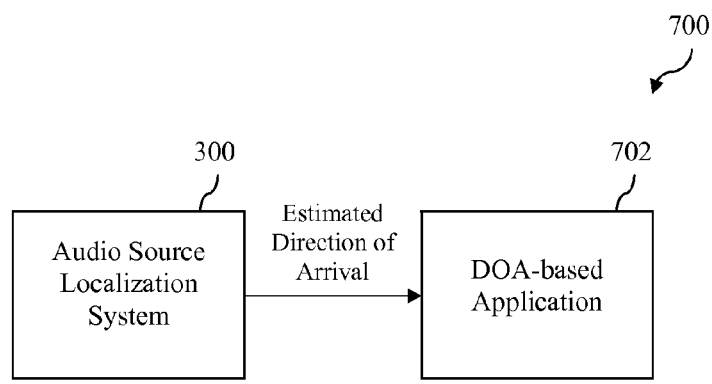
FIG. 7 is a block diagram of a system that implements audio source localization to support a direction of arrival (DOA) based application in accordance with an embodiment of the present invention.

As also noted above, system 300 may be used to support applications other than applications that generate an output audio signal for acoustic transmission such as video gaming applications that take into account the position of a player in a room or other area or surround sound applications that perform proper sound localization based on the position of a listener. FIG. 7 is a block diagram of a system 700 that shows that the estimated direction of arrival produced by audio source localization system 300 may beneficially be provided as an input to any such direction-of-arrival-based application.

C. Example Audio Source Localization Method

Figure 8:
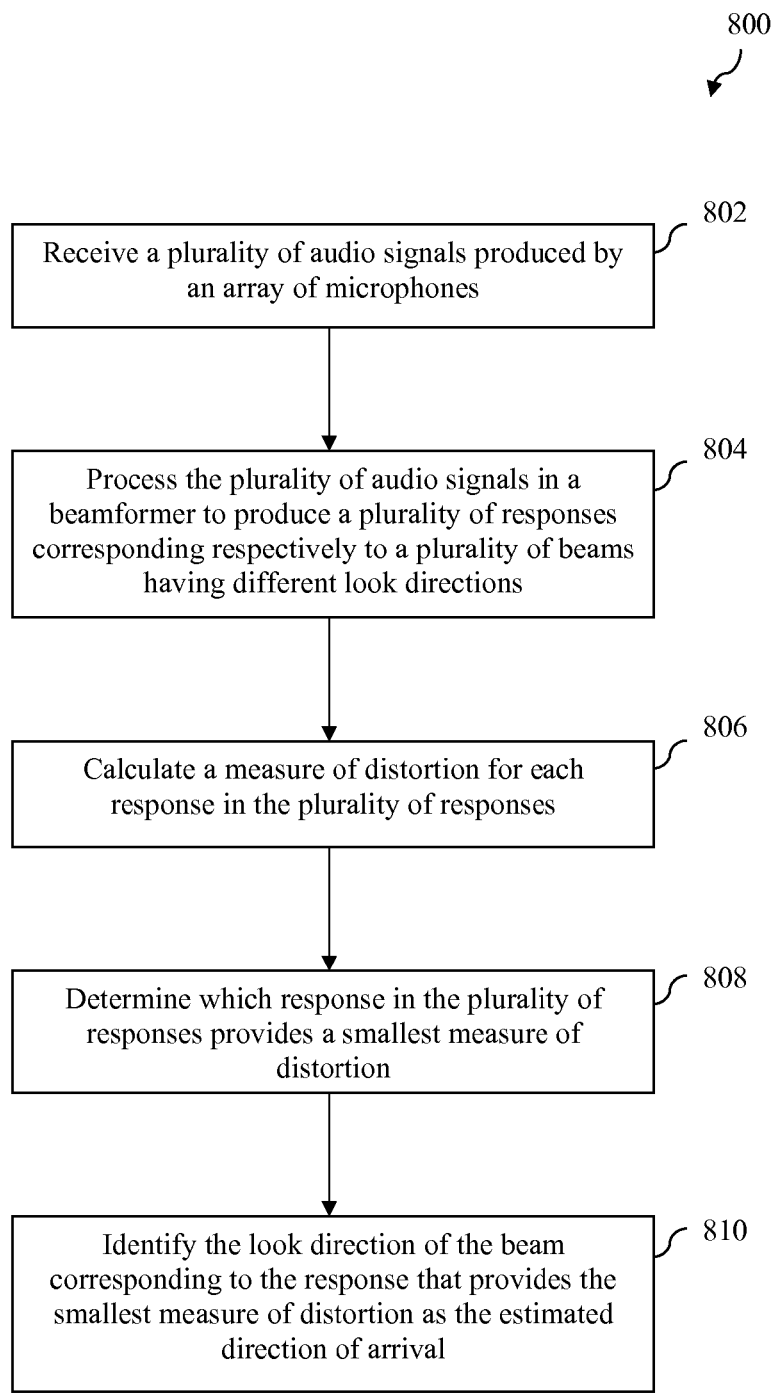
FIG. 8 depicts a flowchart of a method for estimating a direction of arrival of sound waves emanating from an audio source in accordance with an embodiment of the present invention.

FIG. 8 depicts a flowchart 800 of a method for estimating a direction of arrival of sound waves emanating from an audio source in accordance with an embodiment of the present invention. The method of flowchart 800 may be implemented by audio source localization system 300 as described above in reference to FIG. 3. However, the method is not limited to that embodiment and may be implemented by other systems or devices.

As shown in FIG. 8, the method of flowchart 800 begins at step 802 in which a plurality of audio signals produced by an array of microphones is received.

At step 804, the plurality of audio signals is processed in a beamformer to produce a plurality of responses corresponding respectively to a plurality of beams having different look directions. In one embodiment, the plurality of responses corresponds respectively to a plurality of superdirective beams having different look directions. In further accordance with such an embodiment, the plurality of responses may correspond respectively to a plurality of MVDR beams having different look directions. Depending upon the implementation, the plurality of MVDR beams may comprise a plurality of fixed MVDR beams (i.e., beams generated using a fixed MVDR beamformer) or a plurality of adaptive MVDR beams (i.e., beams generated using an adaptive MVDR beamformer).

At step 806, a measure of distortion is calculated for each response in the plurality of responses. In one embodiment, step 806 comprises calculating an absolute difference between a power of each response in the plurality of responses and a reference power. The reference power may comprise, for example, a power of a response of a designated microphone in the array of microphones. The reference power may alternately comprise, for example, an average response power of two or more designated microphones in the array of microphones.

In an alternate embodiment, step 806 comprises calculating a power of a difference between each response in the plurality of responses and a reference response. The reference response may comprise, for example, a response of a designated microphone in the array of microphones.

At step 808, a determination is made as to which response in the plurality of responses provides a smallest measure of distortion. At step 810, the look direction of the beam corresponding to the response that provides the smallest measure of distortion is identified as the estimated direction of arrival.

The method of flowchart 800 may further include using the estimated direction of arrival to support a direction-of-arrival-based application, including but not limited to spatial filtering for acoustic transmission. For example, the method of flowchart 800 may further include the steps of steering a beam produced by a steerable beamformer toward the estimated direction of arrival and processing the plurality of audio signals in the steerable beamformer to produce an output audio signal for acoustic transmission. As another example, the method of flowchart 800 may further include the step of using the response that provides the smallest measure of distortion to produce an output audio signal for acoustic transmission. Other direction-of-arrival-based applications may be supported by the method of flowchart 800.

Figure 9:
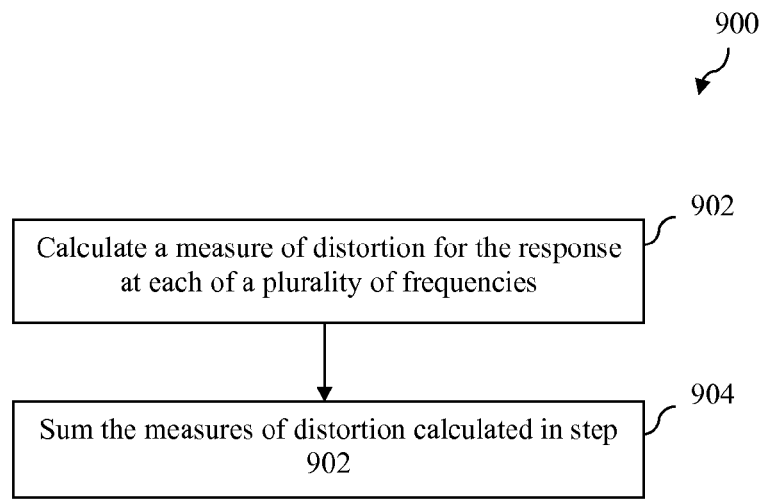
FIG. 9 depicts a flowchart of a method for calculating a measure of distortion for a beam response in accordance with one embodiment of the present invention.

FIG. 9 depicts a flowchart 900 of a method for calculating a measure of distortion for a beam response in accordance with one embodiment of the present invention. The method of flowchart 900 may be used, for example, to implement step 806 of the method of flowchart 800. As shown in FIG. 9, the method of flowchart 900 begins at step 902 in which a measure of distortion is calculated for the beam response at each of a plurality of frequencies. At step 904, the measures of distortion calculated in step 902 are summed to produce the measure of distortion for the beam response.

Figure 10:
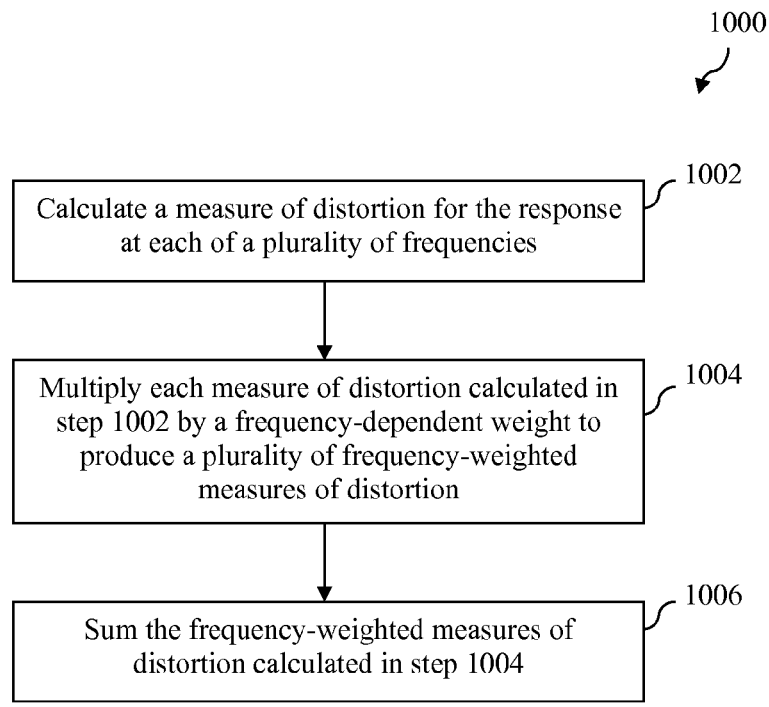
FIG. 10 depicts a flowchart of a method for calculating a measure of distortion for a beam response in accordance with an alternate embodiment of the present invention.

FIG. 10 depicts a flowchart 1000 of a method for calculating a measure of distortion for a beam response in accordance with an alternate embodiment of the present invention. Like the method of flowchart 900, the method of flowchart 1000 may be used, for example, to implement step 806 of the method of flowchart 800. As shown in FIG. 10, the method of flowchart 1000 begins at step 1002 in which a measure of distortion is calculated for the beam response at each of a plurality of frequencies. At step 1004, each measure of distortion calculated in step 1002 is multiplied by a frequency-dependent weight to produce a plurality of frequency-weighted measures of distortion. At step 1006, the frequency-weighted measures of distortion calculated in step 1004 are summed to produce the measure of distortion for the beam response.

D. Example Computer System Implementation

It will be apparent to persons skilled in the relevant art(s) that various elements and features of the present invention, as described herein, may be implemented in hardware using analog and/or digital circuits, in software, through the execution of instructions by one or more general purpose or special-purpose processors, or as a combination of hardware and software.

Figure 11:
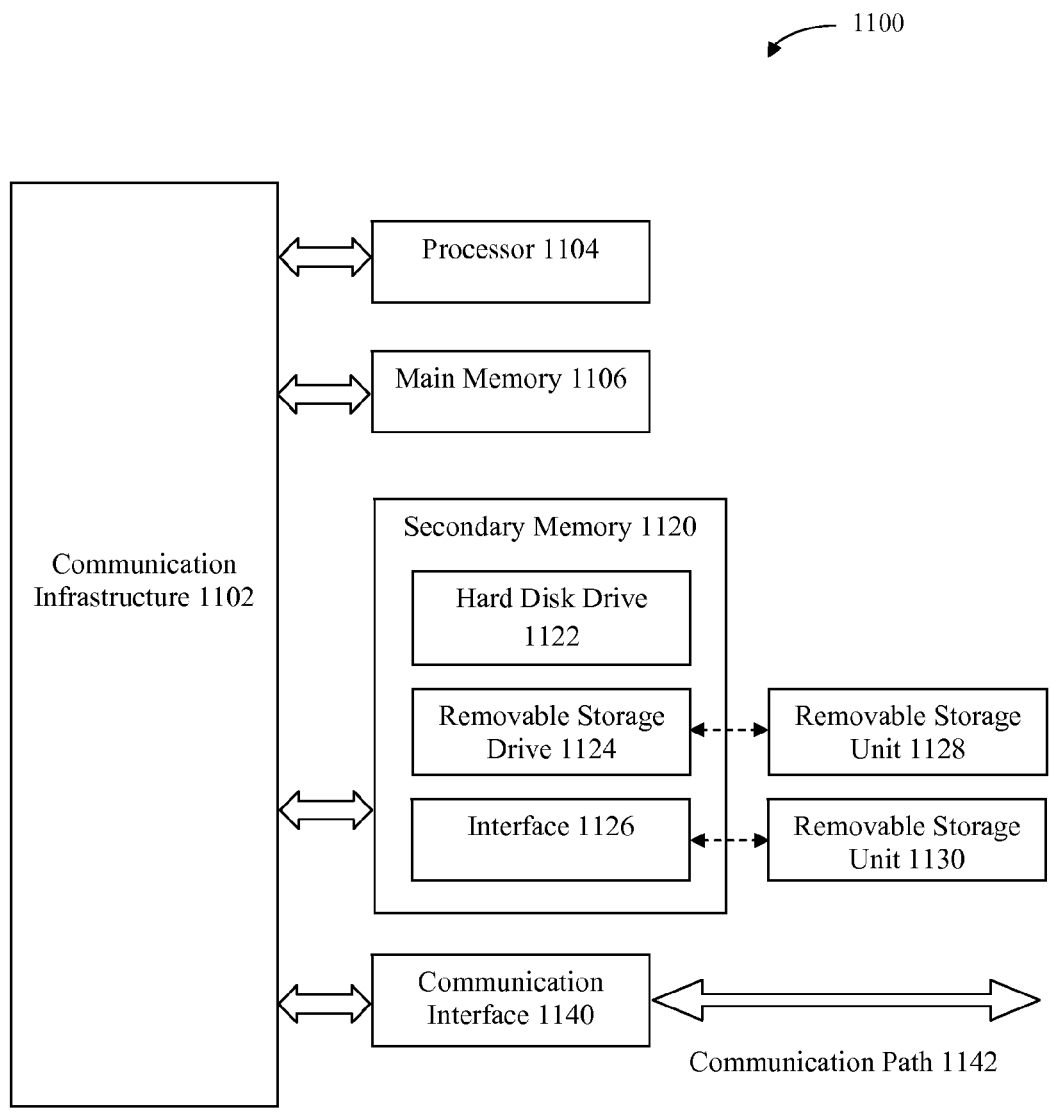
FIG. 11 is a block diagram of a computer system that may be used to implement aspects of the present invention.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 1100 is shown in FIG. 11. All of the logic blocks depicted in FIG. 3, for example, can execute on one or more distinct computer systems 1100. Furthermore, all of the steps of the flowcharts depicted in FIGS. 8-10 can be implemented on one or more distinct computer systems 1100.

Computer system 1100 includes one or more processors, such as processor 1104. Processor 1104 can be a special purpose or a general purpose digital signal processor. Processor 1104 is connected to a communication infrastructure 1102 (for example, a bus or network). Various software implementations are described in terms of this exemplary computer system. After reading this description, it will become apparent to a person skilled in the relevant art(s) how to implement the invention using other computer systems and/or computer architectures.

Computer system 1100 also includes a main memory 1106, preferably random access memory (RAM), and may also include a secondary memory 1120. Secondary memory 1120 may include, for example, a hard disk drive 1122 and/or a removable storage drive 1124, representing a floppy disk drive, a magnetic tape drive, an optical disk drive, or the like.

Removable storage drive 1124 reads from and/or writes to a removable storage unit 1128 in a well known manner. Removable storage unit 1128 represents a floppy disk, magnetic tape, optical disk, or the like, which is read by and written to by removable storage drive 1124. As will be appreciated by persons skilled in the relevant art(s), removable storage unit 1128 includes a computer usable storage medium having stored therein computer software and/or data.

In alternative implementations, secondary memory 1120 may include other similar means for allowing computer programs or other instructions to be loaded into computer system 1100. Such means may include, for example, a removable storage unit 1130 and an interface 1126. Examples of such means may include a program cartridge and cartridge interface (such as that found in video game devices), a removable memory chip (such as an EPROM, or PROM) and associated socket, and other removable storage units 1130 and interfaces 1126 which allow software and data to be transferred from removable storage unit 1130 to computer system 1100.

Computer system 1100 may also include a communications interface 1140. Communications interface 1140 allows software and data to be transferred between computer system 1100 and external devices. Examples of communications interface 1140 may include a modem, a network interface (such as an Ethernet card), a communications port, a PCM-CIA slot and card, etc. Software and data transferred via communications interface 1140 are in the form of signals which may be electronic, electromagnetic, optical, or other signals capable of being received by communications interface 1140. These signals are provided to communications interface 1140 via a communications path 1142. Communications path 1142 carries signals and may be implemented using wire or cable, fiber optics, a phone line, a cellular phone link, an RF link and other communications channels.

As used herein, the terms "computer program medium" and "computer readable medium" are used to generally refer to media such as removable storage units 1128 and 1130 or a hard disk installed in hard disk drive 1122. These computer program products are means for providing software to computer system 1100.

Computer programs (also called computer control logic) are stored in main memory 1106 and/or secondary memory 1120. Computer programs may also be received via communications interface 3140. Such computer programs, when executed, enable the computer system 1100 to implement the present invention as discussed herein. In particular, the computer programs, when executed, enable processor 1100 to implement the processes of the present invention, such as any of the methods described herein. Accordingly, such computer programs represent controllers of the computer system 1100. Where the invention is implemented using software, the software may be stored in a computer program product and loaded into computer system 1100 using removable storage drive 1124, interface 1126, or communications interface 1140.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

E. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for estimating a direction of arrival of sound waves emanating from an audio source, comprising:
   receiving a plurality of audio signals produced by an array of microphones;
   processing the plurality of audio signals in a beamformer to produce a plurality of responses corresponding respectively to a plurality of beams having different look directions;
   calculating a measure of distortion for each response in the plurality of responses;
   determining which response in the plurality of responses provides a smallest measure of distortion; and
   identifying the look direction of the beam corresponding to the response that provides the smallest measure of distortion as the estimated direction of arrival.

2. The method of claim 1, wherein the plurality of responses corresponds respectively to a plurality of superdirective beams having different look directions.

3. The method of claim 2, wherein the plurality of responses corresponds respectively to a plurality of Minimum Variance Distortionless Response (MVDR) beams having different look directions.

4. The method of claim 3, wherein the plurality of MVDR beams comprises a plurality of fixed MVDR beams.

5. The method of claim 3, wherein the plurality of MVDR beams comprises a plurality of adaptive MVDR beams.

6. The method of claim 1, wherein calculating the measure of distortion for each response in the plurality of responses comprises:
   calculating an absolute difference between a power of each response in the plurality of responses and a reference power.

7. The method of claim 6, wherein the reference power comprises a power of a response of a designated microphone in the array of microphones.

8. The method of claim 6, wherein the reference power comprises an average response power of two or more designated microphones in the array of microphones.

9. The method of claim 1, wherein calculating the measure of distortion for each response in the plurality of responses comprises:
   calculating a power of a difference between each response in the plurality of responses and a reference response.

10. The method of claim 1, wherein calculating the measure of distortion for a response in the plurality of responses comprises:
    (a) calculating a measure of distortion for the response at each of a plurality of frequencies;
    (b) summing the measures of distortion calculated in step (a).

11. The method of claim 1, wherein calculating the measure of distortion for a response in the plurality of responses comprises:
    (a) calculating a measure of distortion for the response at each of a plurality of frequencies;

(b) multiplying each measure of distortion calculated in step (a) by a frequency-dependent weight to produce a plurality of frequency-weighted measures of distortion; and (c) summing the frequency-weighted measures of distortion calculated in step (b).

12. The method of claim 1, further comprising:

steering a beam produced by a steerable beamformer toward the estimated direction of arrival; and processing the plurality of audio signals in the steerable beamformer to produce an output audio signal for acoustic transmission.

13. The method of claim 1, further comprising:

using the response that provides the smallest measure of distortion to produce an output audio signal for acoustic transmission.

14. A system for estimating a direction of arrival of sound waves emanating from an audio source, comprising:

an array of microphones;

a beamformer that processes a plurality of audio signals produced by the array of microphones to produce a plurality of responses corresponding respectively to a plurality of beams having different look directions;

a distortion calculator that calculates a measure of distortion for each response in the plurality of responses; and a direction of arrival selector that determines which response in the plurality of responses provides a smallest measure of distortion and identifies the look direction of the beam corresponding to the response that provides the smallest measure of distortion as the estimated direction of arrival.

15. The system of claim 14, wherein the plurality of responses corresponds respectively to a plurality of superdirective beams having different look directions.

16. The system of claim 15, wherein the plurality of responses corresponds respectively to a plurality of Minimum Variance Distortionless Response (MVDR) beams having different look directions.

17. The system of claim 16, wherein the plurality of MVDR beams comprises a plurality of fixed MVDR beams.

18. The system of claim 16, wherein the plurality of MVDR beams comprises a plurality of adaptive MVDR beams.

19. The system of claim 14, wherein the distortion calculator calculates the measure of distortion for each response in the plurality of responses by calculating an absolute difference between a power of each response in the plurality of responses and a reference power.

20. The system of claim 19, wherein the reference power comprises a power of a response of a designated microphone in the array of microphones.

21. The system of claim 19, wherein the reference power comprises an average response power of two or more designated microphones in the array of microphones.

22. The system of claim 14, wherein the distortion calculator calculates the measure of distortion for each response in the plurality of responses by calculating a power of a difference between each response in the plurality of responses and a reference response.

23. The system of claim 14, wherein the distortion calculator calculates the measure of distortion for a response in the plurality of responses by:

(a) calculating a measure of distortion for the response at each of a plurality of frequencies;

(b) summing the measures of distortion calculated in step (a).

24. The system of claim 14, wherein the distortion calculator calculates the measure of distortion for a response in the plurality of responses by:

(a) calculating a measure of distortion for the response at each of a plurality of frequencies;

(b) multiplying each measure of distortion calculated in step (a) by a frequency-dependent weight to produce a plurality of frequency-weighted measures of distortion; and (c) summing the frequency-weighted measures of distortion calculated in step (b).

25. The system of claim 14, further comprising:

a steerable beamformer that is configured to steer a beam toward the estimated direction of arrival and to process the plurality of audio signals to produce an output audio signal;

acoustic transmission logic configured to transmit the output audio signal.

26. The system of claim 14, further comprising:

acoustic transmission logic configured to transmit an output audio signal produced using the response that provides the smallest measure of distortion.

27. A computer program product comprising a computer-readable medium having computer program logic recorded thereon for enabling a processor to estimate a direction of arrival of sound waves emanating from an audio source, the computer program logic comprising:

first means for enabling the processor to receive a plurality of audio signals produced by an array of microphones;

second means for enabling the processor to process the plurality of audio signals to produce a plurality of responses corresponding respectively to a plurality of beams having different look directions;

third means for enabling the processor to calculate a measure of distortion for each response in the plurality of responses;

fourth means for enabling the processor to determine which response in the plurality of responses provides a smallest measure of distortion; and fifth means for enabling the processor to identify the look direction of the beam corresponding to the response that provides the smallest measure of distortion as the estimated direction of arrival.

* * * * *